(12) United States Patent
Cohen-Solal et al.

(10) Patent No.: US 7,020,336 B2
(45) Date of Patent: Mar. 28, 2006

(54) IDENTIFICATION AND EVALUATION OF AUDIENCE EXPOSURE TO LOGOS IN A BROADCAST EVENT

(75) Inventors: Eric Cohen-Solal, Ossining, NY (US); Vasanth Philomin, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 689 days.

(21) Appl. No.: 10/014,190

(22) Filed: Nov. 13, 2001

(65) Prior Publication Data
US 2003/0091237 A1 May 15, 2003

(51) Int. Cl.
G06K 9/46 (2006.01)
(52) U.S. Cl. ............ 382/204; 348/157; 348/169; 348/700; 382/291; 702/92; 702/94
(58) Field of Classification Search ............ 382/196, 382/199, 224, 225, 226, 227, 284, 287, 294, 382/180, 204; 702/85, 92, 93, 94; 348/61, 348/135, 157, 164, 169, 170, 171, 172, 578, 348/587, 589, 700, 722
See application file for complete search history.

(56) References Cited

U.S. PATENT DOCUMENTS

| | | | | |
|---|---|---|---|---|
| 5,264,933 A * | 11/1993 | Rosser et al. | | 348/578 |
| 5,524,065 A * | 6/1996 | Yagasaki | | 382/226 |
| 5,543,856 A * | 8/1996 | Rosser et al. | | 348/578 |
| 5,862,517 A * | 1/1999 | Honey et al. | | 702/85 |
| 5,892,554 A * | 4/1999 | DiCicco et al. | | 348/584 |
| 5,912,700 A * | 6/1999 | Honey et al. | | 348/157 |
| 5,917,553 A * | 6/1999 | Honey et al. | | 348/578 |
| 5,953,076 A * | 9/1999 | Astle et al. | | 348/584 |
| 5,963,670 A * | 10/1999 | Lipson et al. | | 382/224 |
| 5,969,755 A | 10/1999 | Courtney | | 348/143 |
| 6,069,655 A | 5/2000 | Seeley et al. | | 348/154 |
| 6,100,925 A * | 8/2000 | Rosser et al. | | 348/169 |
| 6,100,941 A * | 8/2000 | Dimitrova et al. | | 348/700 |
| 6,133,946 A * | 10/2000 | Cavallaro et al. | | 348/135 |
| 6,230,204 B1 * | 5/2001 | Fleming, III | | 709/229 |
| 6,266,100 B1 * | 7/2001 | Gloudemans et al. | | 348/587 |
| 6,356,669 B1 * | 3/2002 | Darrell | | 382/294 |

(Continued)

FOREIGN PATENT DOCUMENTS

EP 0578558 A1 12/1994

OTHER PUBLICATIONS

McKenna, Stephen et al., *Tracking Faces*, Proceedings of the Second Int'l Conference on Automatic Face and Gesture Recognition, Oct. 14-16, 1996, Killington VT, pp. 271-276.

(Continued)

*Primary Examiner*—Bhavesh M. Mehta
*Assistant Examiner*—Gregory Desire
(74) *Attorney, Agent, or Firm*—Larry Liberchuk (57) ABSTRACT

Method and system of detecting and analyzing the presence of a logo in one or more datastreams. In the method, at least one video datastream of an event is first received. Next, one or more regions of interest (ROIs) for the logo in one or more images comprising the at least one datastream are identified. The one or more ROIs are analyzed to detect if the logo is present in the ROI. If so, the detection of the presence of the logo is used in making either a broadcasting decision or an advertising decision.

15 Claims, 3 Drawing Sheets

U.S. PATENT DOCUMENTS

| | | | |
|---|---|---|---|
| 6,446,261 B1* | 9/2002 | Rosser | 725/34 |
| 6,466,275 B1* | 10/2002 | Honey et al. | 348/722 |
| 6,486,920 B1* | 11/2002 | Arai et al. | 348/563 |
| 6,690,829 B1* | 2/2004 | Kressel et al. | 382/225 |
| 6,718,551 B1* | 4/2004 | Swix et al. | 725/32 |
| 6,750,919 B1* | 6/2004 | Rosser | 348/584 |
| 6,757,584 B1* | 6/2004 | Thess et al. | 700/223 |
| 6,778,705 B1* | 8/2004 | Gutta et al. | 382/224 |
| 6,792,205 B1* | 9/2004 | Frisken et al. | 396/138 |
| 6,810,086 B1* | 10/2004 | Puri et al. | 375/240.29 |
| 6,850,250 B1* | 2/2005 | Hoch | 345/632 |

OTHER PUBLICATIONS

U.S. Appl. No. 09/794,443, entitled "Classification Of Objects Through Model Ensembles" for Srinivas Gutta and Vasanth Philomin, filed Feb. 27, 2001.

Gutta, S., et al. *Mixture Of Experts For Classification of Gender, Ethnic Origin and Pose of Human Faces*, IEEE Transactions On Neural Networks, vol. 11, No. 4, (Jul. 2000), pp. 948-960.

"Autonomous Driving Approaches Downtown" by U. Franke et al., IEEE Intelligent Systems, vol. 13, No. 6, 1998.

"Real-Time Object Detection For "Smart" Vehicles" by D.M. Gavrila and V. Philomin, Proceedings of IEEE International Conference On Computer Vision, Kerkyra, Greece 1999.

"Texture Classification By Center Symmetric Auto-Correlation, Using Kullback Discrimination Of Distributions" by David Harwood, et al., Pattern Recognition Letters, 16 (1995), pp. 1-10.

"Hand Gesture Recognition Using Ensembles Of Radial Basis Function (RBF) Networks And Decision Trees" by Srinivas Gutta et al, International Journal Of Pattern Recognition And Artificial Intelligence, vol. 11, No. 6, pp. 845-872 (1997).

* cited by examiner

IDENTIFICATION AND EVALUATION OF AUDIENCE EXPOSURE TO LOGOS IN A BROADCAST EVENT

FIELD OF THE INVENTION

This invention relates to content based video analysis for identification of logos in a video datastream.

BACKGROUND OF THE INVENTION

Advertising is an essential means by which to introduce, promote and maintain the purchasing public's familiarity with new and/or extant brands. Advertising efforts typically include selecting a unique logo, displaying the logo to the public in a manner that associates positive product attributes to the logo, and maximizing the purchasing public's exposure to that logo. The more successful logos are typically unique in shape, size, or other features, such as color or texture (e.g., McDonald's™ golden arches, Nike™ swosh symbol, etc).

Advertising during broadcast events, such as sporting events, is one of the most effective ways to expose products and brand logos to a broad and diverse audience. The success of broadcast advertising has resulted in an escalation in cost, and this success is evidenced by its high cost. Advertisers typically have difficulty in evaluating the efficacy of money spent on advertising during broadcast events. Advertisers are similarly interested in conductive comparative surveys of exposure obtained by other advertisements.

Recently acquired habits and capabilities of television viewers, as well as new forms of advertising, complicate the efforts of advertisers and heighten the need for advertisers to independently monitor broadcast advertisements. Although the total number of television viewers continues to grow, viewers are becoming increasingly more adept at bypassing the traditional commercial breaks that typically appear at 15 minute intervals. The methods of bypass include changing the channel at the start of a commercial break or using a VCR or TiVo™ recorder to tape a show and then fast-forwarding past the commercial break. To overcome this new-found ability of modem audiences to filter their viewing by bypassing standard commercial break segments, advertisers are placing their logos and/or products within the show itself, either by logo placement or product placement type advertisements.

Logo placement is seen at practically every sporting event, where logos emblazon the walls of baseball stadiums, race car tracks and football stadiums, as well as on basketball court floors. Similar to logo placement, product placement not only thwarts the filtering efforts of the viewers, but has the additional benefit of more closely correlating the advertiser's brand to the attributes of a particular show (e.g., placing a bottle of Coppertone™ suntanning lotion on the set of the Baywatch show).

A significant drawback to product and logo placement is that advertisers must relinquish the control over the creation and airing of a standard 30-second commercial, leaving it principally to the show's producer to see that the logo appears within the broadcast in the correct manner, and for the appropriate amount of time. A producer may not always share the advertiser's focus on whether the brand logo is displayed in a manner that is visible to the audience. This relinquishment of control of logo exposure elevates the need for advertisers to independently confirm acceptable broadcast of paid-for advertising.

Verifying audience exposure to virtual logos is an additional challenge, since virtual logos can be inserted into a broadcast at any stage of production. Virtual ads are digital enhancements of event broadcasts, and although they are typically added to blank spaces on stadiums walls, they can also be used to replace another advertisement of similar size. Despite the fact that they do not exist in real life, virtual advertisements appear real to the audience. The advent of virtual advertisements increases the need to independently monitor whether a logo actually makes it into the final event, as broadcast to the audience. Utilization of virtual advertisements is in its nascent stage, and its use expected to grow significantly.

Ad-hoc manual scanning of a broadcast by an individual may be used to attempt to identify the appearance of a logo. Such a task is subject to human error, including distractions, subjective nature of the identification, etc., among other difficulties. The task of tracking virtual advertisements in a broadcast event is even more uncertain due to the possibility of sudden and random placement of a substitute virtual image either by the event producer or by broadcast personnel who may subsequently manipulate the broadcast image. Further compounding the task is the proliferation of television stations and broadcast events, multiplying the voluminous amount of information to be surveyed. People lack the wherewithal for minute analysis of large volumes of data, as necessary to survey an event broadcast, and tabulate the duration of every appearance of a logo.

Aside from the difficulties in relying on human subjectivity in locating the advertisements, the prior art provides no mechanism to tally the logo exposure time in a reproducible and non-subjective manner. Any statistical analysis based human-generated data will suffer from the inherent subjectivity of the evaluators. Moreover, alternating between the multiple cameras that typically cover sporting events will shift the perspective and position of the displayed logo, potentially causing an observer to overlook a portion of the logo exposure time.

There are numerous processes for detecting the presence of objects in a videostream. For example, U.S. Pat. No. 5,969,755 to Courtney, the contents of which are hereby incorporated by reference, describes a particular motion based technique for automatic detection of removal of an object in video received from a surveillance camera. Courtney divides the video image into segments and video-objects, which are identified in the segments by comparing a reference image with the current image, identifying change regions and tracking them between received video frames to provide updated position and velocity estimation of the object. Courtney and like techniques, however, are limited to detection of removal of an object. They do not provide a mechanism for detecting and analyzing logo appearance or placement.

SUMMARY OF THE INVENTION

An objective of the invention is to provide a system and method to positively identify, in a real-time and a reproducible manner, and to track the quality and frequency of appearances of two or three dimensional logos in one or more datastreams, whether viewed frontally or from a varying perspective. It is an objective to identify and track a logo in a datastream in an automatic and objective manner. Further objectives are to use the detection and tracking of the logo for further analysis and/or decision-making, including analysis of exposure time of the logo during an event (which may then be used in marketing and advertising decisions)

and broadcast decisions (for example, determining which of a number of cameras to used in broadcasting the event).

Another objective of the invention is to automate the logo recognition process, providing detailed and non-subjective analysis of the frequency, duration and degree of prominence of display of target logos. The invention provides the advantage of performing reproducible analysis based on the broadcast image, eliminating the need for manual viewing of the program and searching for each occurrence of the target logos. Elimination of human operator subjectivity and digitization of the process allows greater certainty of the search results and allows more definitive and reproducible analysis to be performed. Additionally, the invention can assign a value to each appearance of the logo, with the value varying in accordance with the clarity and/or size of the display of the logo, thereby informing the advertiser of the logo view-ability.

Still another objective of the invention is to provide a real-time notification to the broadcast producer of the appearance of one or more target logos among the plurality of cameras typically used to film a broadcast event. The producer may, for example, use the information to select which camera is used to broadcast the event.

In accordance with these objectives, the invention comprises a method of detecting and analyzing the presence of a logo in one or more datastreams. First, at least one video datastream of an event is received. Next, one or more regions of interest (ROIs) for the logo in one or more images are identified, where the one or more images comprise the at least one datastream. The one or more ROIs are analyzed to detect if the logo is present in the ROI. If so, the detection of the presence of the logo is used in making either a broadcasting decision or an advertising decision.

In one embodiment, the at least one video datastream comprises a single broadcast datastream, the time the logo is detected during the event is compiled, and the time of detection is used to make an advertising decision. In another embodiment, the at least one video datastream comprises two or more separate video datastreams, the two or more datastreams selectable for broadcasting the event. In that case, detection of the logo in one or more of the datastreams is used in a broadcast decision, for example, one of the datastreams in which the logo is detected is selected and used to broadcast the event.

The step of identifying one or more ROIs for the logo is, for example, based on the color, shape, and/or texture of the logo. If, for example, color is used, a number of adjacent pixels having the same color as the logo may be used to identify an ROI. If, for example, texture is used, center-symmetric covariance measures in a proximate location within the image that correspond to the borders of the logo may be used in identifying an ROI. If, for example, shape is used, template matching that identifies shapes within the image that correspond with the shape of the logo may be used in identifying an ROI.

The step of analyzing the one or more ROIs to detect if the logo is present in the ROI comprises, for example, using radial basis function (RBF) classification modeling. The RBF classification modeling may include training using images of the logo having a multiplicity of perspectives and scales. Alternatively, for example, the step of analyzing the one or more ROIs to detect if the logo is present in the ROI comprises use of template matching.

The invention also comprises a system for detecting and analyzing the presence of a logo. The system comprises, for example, a processor having input that receives at least one video datastream of an event. The processor includes processing software (or other digitally formatted algorithms) that identifies one or more ROIs for the logo in one or more images comprising the at least one datastream. The processor analyzes the one or more ROIs to detect if the logo is present in the ROI and monitors the presence of a detected logo. Detection of the presence of the logo is used in making either a broadcasting decision or an advertising decision. In one case, for example, the processor receives one video datastream of the event, where the one video datastream comprises a single broadcast datastream. In another exemplary case, the processor receives two or more separate video datastreams, were the two or more datastreams may each be selected for broadcasting the event.

The invention also comprises software for detecting and analyzing the presence of a logo. The software receives as input digital representations of images that comprise at least one video datastream of an event. The software identifies one or more ROIs for the logo in one or more images comprising the at least one datastream. The software then analyzes the one or more ROIs to detect if the logo is present in the ROI. If so, the software monitors the presence of the detected logo and provides an output regarding detection of the presence of the logo that is usable in making either a broadcasting decision or an advertising decision.

The invention also comprises a system for detecting and analyzing the presence of a logo. The system comprises a processor having input that receives at least one video datastream of an event. The processor analyzes the image to determine if the logo is present in at least one portion of the image and monitors the presence of the logo in the image when so detected. Detection of the presence of the logo is used in making one of a broadcasting decision and an advertising decision.

BRIEF DESCRIPTION OF THE DRAWINGS

The above and other objects, features and advantages of the present invention will be become more apparent from the following detailed description when taken in conjunction with the accompanying drawings, in which:

FIG. 1b is a representation of the image of the logo captured by the cameras of FIG. 1a;

DETAILED DESCRIPTION

Figure 1A:
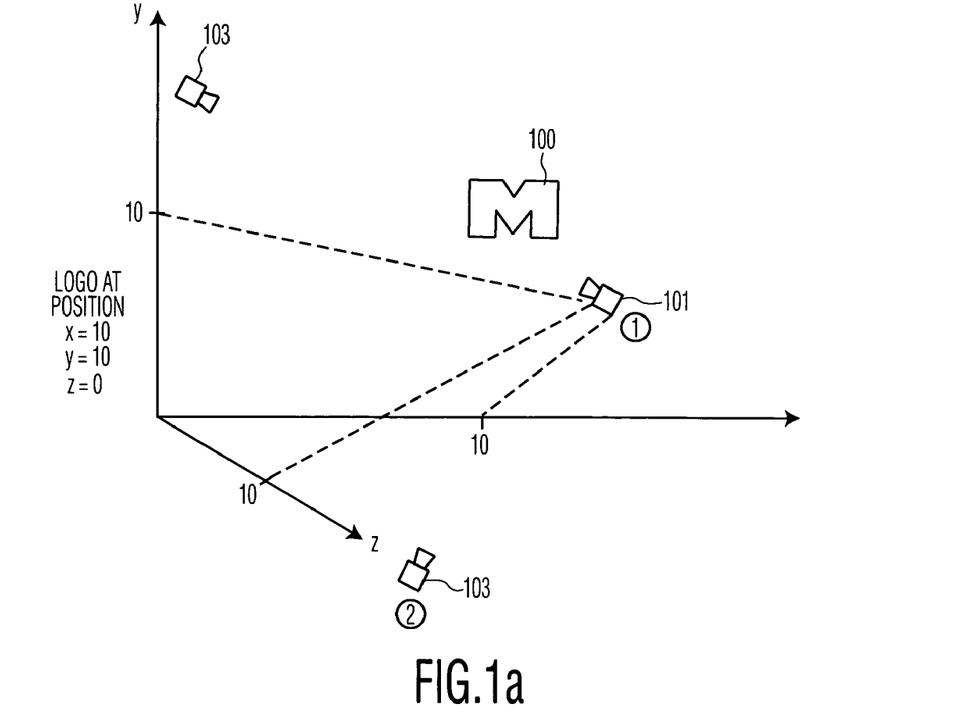
FIG. 1a is schematic of a typical positioning of cameras used to film and generate a number of video datastreams used to broadcast an event that includes a logo as a backdrop.

FIG. 1a is a representation of several cameras 101–103 in a frame of reference that are used to capture images of an event and each provide a number of video datastreams, which may be selected to broadcast the event, such as a sporting event. The different cameras 101–103 are trained on portions of the event (which may overlap) from different perspectives and angles. The camera chosen for broadcasting the event changes throughout the event depending on broadcast decisions and considerations, which in the past were typically related to the event itself. The various positions, angles, etc. of the cameras themselves may be moved or adjusted.

Figure 1B:
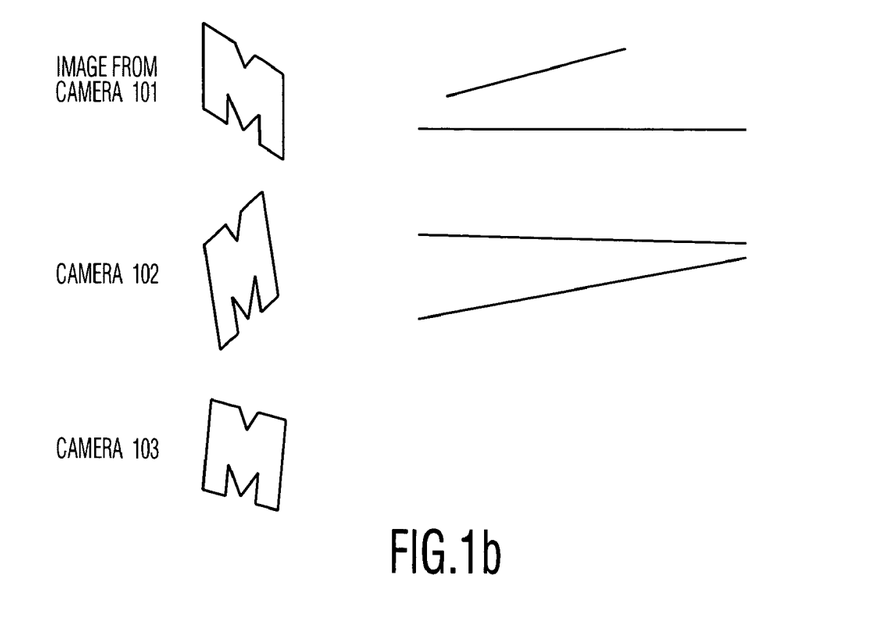

FIG. 1a also shows a representative logo, shown in the form of a large "M", that may be captured with the images of some or all of the cameras 101–103. It is also noted that a camera that is broadcasting the event may also capture the logo within its field of view for a time, and then pan to another portion of the event and exclude the logo from the broadcast.

Where the target logo 100 is in a position so that all three of cameras 101–103 capture the logo in their fields of view, examples of the different perspectives of the target logo 100 that may be included in the images from the various cameras are shown in FIG. 1b. (The logos are focused on in FIG. 1b, but will, of course, be part of a broad image of the event.) Thus, the logo may have various perspectives and scales in the different datastreams, may be partially or entirely shown, or not shown at all, for example, depending on the camera being used at the time to broadcast the event.

Figure 2:
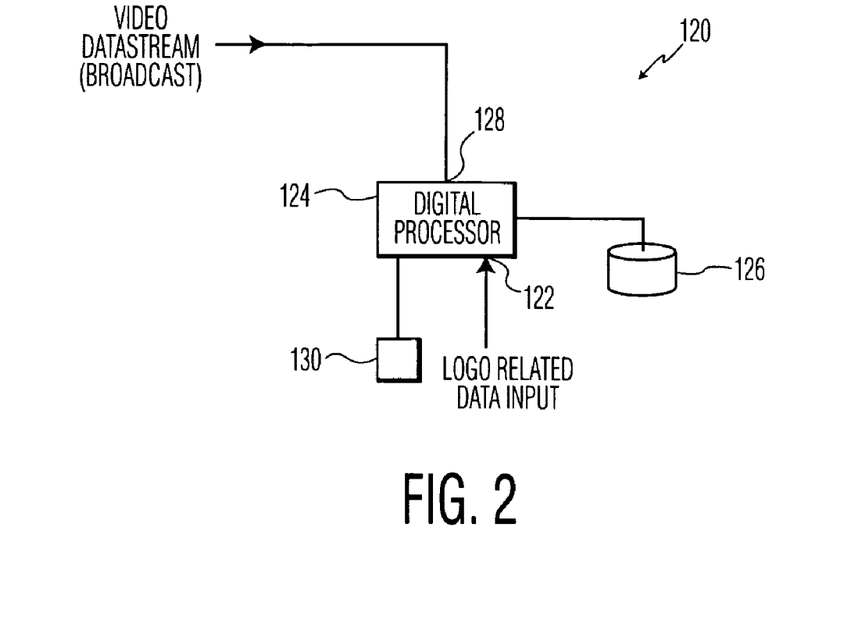
FIG. 2 depicts a system in accordance with one embodiment of the invention.

An embodiment of the invention is set out in block diagram format in FIG. 2. Central to the system 120 is a digital processor 124, associated memory 126 and attendant software that will be described in more detail below. In operation, that is, after programming in accordance with the description below, processor 124 receives a broadcast datastream via an input interface 128 and processes the datastream to detect a particular logo, among other things, as also further described below. In this embodiment, the determination of which video datastream to broadcast has been made elsewhere upstream from system 120, and the system analyzes the datastream that is broadcast. Thus, in general, the video broadcast includes images from the datastream of one camera covering an event (such as camera 101 in FIG. 1a), followed by images from the datastreams of other cameras covering the event (such as cameras 102 or 103 in FIG. 1a), etc. The video broadcast is, for example, a digital video datastream. If the broadcast is an analog signal, then processor 124 or another component of the system 120 may include an A/D converter.

An external interface 130 allows a user to initiate operation of the system 120 for detection of a logo (among other things) in the video broadcast. It also allows the user to program the system 120, as also described in more detail below. Among other things, attendant to the programming of the system will typically include loading base-line data related to the image that is then used by the system 120 in performing detection of a logo in the broadcast.

Figure 3:
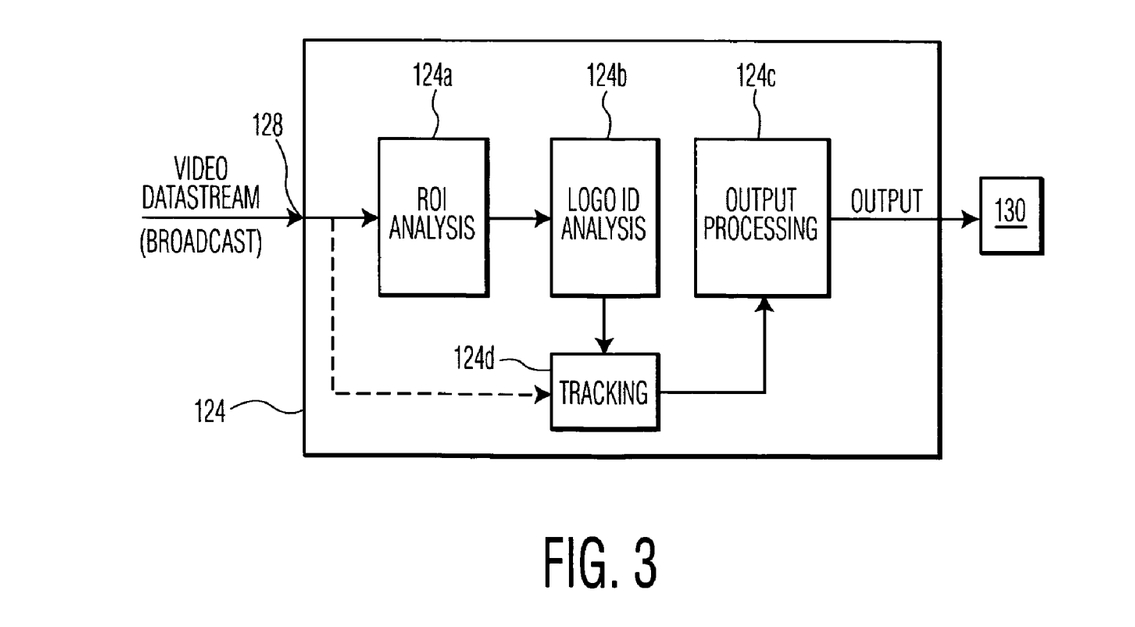
FIG. 3 depicts details of one of the components of FIG. 2.

FIG. 3 is a block diagram that represents the processing stages performed by processor 124 on the video broadcast. The processor first performs an ROI analysis 124a on the received video broadcast (also referred to as the video datastream). Generally speaking, the ROI analysis 124a rapidly identifies certain sub-regions of the image that are more likely to contain the logo, in order to focus the subsequent logo identification analysis on those portions of the image. As described further below, the ROI analysis 124a may focus on identifying one or more portions of the image that contain one or more general features of the logo, such as shape, color and/or texture of the logo. Any such identified region is an ROI that is considered for further analysis.

The processor 124 then uses the ROIs identified in the images in the datastream in a logo identification analysis 124b. As also described further below, the processing in this analysis determines whether the logo is present in any of the ROIs. Once a logo (or logos) is positively identified in the image datastream, the logo is tracked in the image using tracking processing 124d. (If more than one logo is identified, they may all be tracked simultaneously in the image.)

Once a logo is identified in the image, the processing will generally track the logo, and suspend the ROI and logo identification steps. If, however, the logo moves out of the image (out of the field of view of the camera providing the datastream), for example, because the camera is pivoted or the broadcast is switched to another camera covering the event, then the ROI and logo identification processing 124a, 124b are re-initiated.

As also shown in FIG. 3, the processor 124 also uses the tracking data to perform output processing 124c. This includes, for example, compiling the amount of time the logo appears in the datastream, among other analysis. The output is provided to the user interface 130, such as a graphic display.

ROI analysis 124a is performed in at least one of a number of ways by processor 124. The received image may be scanned, for example, to identify ROI regions within the image based on color, shape and/or texture of the logo, among other things. Referring to the "M" logo shown in FIGS. 1a and 1b, if the "M" is a continuous red color, then the ROI analysis 124a may analyze the incoming images for sub-regions having a certain number of adjacent red picture elements. The analysis may require a certain number of adjacent red pixels before it is identified as an ROI (thus eliminating, for example, features in the image that cannot be resolved).

Similarly, the ROI analysis may consider texture of the sub-regions within the image that broadly match the parameters of the logo under consideration. For example, sub-regions of the image are sequentially considered as possible ROIs that potentially contains the logo. For each sub-region, samples of the image are considered and local center-symmetric auto-correlation measures are generated for the sample. These include linear and rank-order versions, along with a related covariance measure and a variance ratio. Apart from the related covariance measure, all such measures generated for the samples are rotation invariant robust measures and are locally gray-scale invariant. Thus, the various possible perspectives of the logo (such as the "M" shown in FIG. 1b) will not affect these measures. The measures are all abstract measures of texture pattern and scale-scale, thus providing highly discriminating information about the level of local texture in the samples. By comparing the sampled texture measures within the ROI with known texture measures of the logo, and determining that the correlation between the sampled measures and the known measures meets a threshold level, a determination is made that the sub-region is an ROI. Such texture analysis of an image is further described in "Texture Classification By Center Symmetric Auto-Correlation, Using Kullback Discrimination Of Distributions" by David Harwood, et al., Pattern Recognition Letters, 16 (1995), pp. 1–10, the contents of which are hereby incorporated by reference herein.

In addition, the ROI analysis may consider the shapes found in sub-regions within the image that broadly match the parameters of the logo under consideration. For example, if the logo has a circular border, then in various perspectives it may appear circular or oval. The image may thus be analyzed to determine sub-regions having ovals of a certain threshold size. To determine matching shapes, the ROI processing may use template matching in analyzing the sub-regions of the image, and/or a gradient analysis, for example. Such a processing technique may be adapted from the hierarchical template matching approach described in D. M. Gavrila and V. Philomin, "Real-time Object Detection for "Smart" Vehicles", Proceedings of the IEEE International Conference on Computer Vision, Kerkyra, Greece (1999), the contents of which are hereby incorporated by reference herein. (The document is available at www.gavrila.net). Analyzing an image gradient is also further described in U.S. patent application Ser. No. 09/794,443, entitled "Classification Of Objects Through Model Ensembles" for Srinivas Gutta and Vasanth Philomin, filed Feb. 27, 2001, which is hereby incorporated by reference herein and referred to as the "'443 application".

Thus, using at least one such technique, processor 124 is programmed to conduct the image processing to identify ROIs for the particular logo under consideration. Alternatively, processor 124 may be programmed to receive a frontal image of the logo, for example, and to generate parameters pertaining to the logo that correspond to various ROI analysis techniques (such as color, texture, shape, etc.), as described above. A series of images of the logo that represent different scales, perspectives and illumination may also be generated. Processor 124 may use the parameters developed to test each different ROI analysis technique, using the series of images of the logo in a background image, for example. The technique that identifies the greatest number of the series of logos as ROIs in the background image is used as the ROI analysis 124a by processor 124 for the particular logo.

Once one or more ROIs in an image are identified, they are each further analyzed to determine whether the logo is actually found therein. As noted above, this processing falls under the rubric of logo ID analysis 124b of FIG. 3. Although one ROI will be referred to for convenience in the ensuing description, the same logo ID processing is applied to all ROIs identified in the image. To conduct the logo ID analysis 124b, processor 124 is programmed with one of a number of various types of classification models, such as a Radial Basis Function (RBF) classifier, which is a particularly reliable classification model. The '443 application describes an RBF classification technique for identification of objects in an image, which may be a logo, and is thus used in the preferred embodiment for programming the processor 124 to identify whether or not a feature in an ROI is the logo. It is noted that the '443 application also treats classification of an object that is moving in the image. Thus, the RBF classification technique may be used for logo ID where the object moves in the ROI for a succession of images (for example, where the camera providing the image is pivoted), as well as an object that is stationary (i.e., has zero motion) in the ROI of the image.

In short, the RBF classifier technique described extracts two or more features from each object in the ROI. Preferably, the x-gradient, y-gradient and combined x-y-gradient are extracted from each detected object. The gradient is of an array of samples of the image intensity given in the video datastream for the moving body. Each of the x-gradient, y-gradient and x-y-gradient images are used by three separate RBF classifiers that give separate classification. As described further below, this ensemble of RBF (ERBF) classification for the object improves the identification.

Each RBF classifier is a network comprised of three layers. A first input layer is comprised of source nodes or sensory units, a second (hidden) layer comprised of basis function (BF) nodes and a third output layer comprised of output nodes. The gradient image of the moving object is fed to the input layer as a one-dimensional vector. Transformation from the input layer to the hidden layer is non-linear. In general, each BF node of the hidden layer, after proper training using images for the class, is a functional representation of one of a common characteristic across the shape space of the object classification (such as the logo). The training may include inputting a large number of images of the logo, from different perspectives, different scales, different illumination, etc. (As described above, training images may be supplied via the user interface 130 and data input 132 shown in FIG. 2.) Alternatively, the processor 124 may include software that receives a front perspective of the logo, generates a mathematical model of the logo, and internally rotates, re-scales, etc. the mathematical model of the logo, thereby generating various views of the logo having different perspectives, scalings, etc. Each BF node of the hidden layer, after proper training using images for the logo class, transforms the input vector into a scalar value reflecting the activation of the BF by the input vector, which quantifies the amount the characteristic represented by the BF is found in the vector for the object (in this case, the logo) in the image under consideration.

The output nodes map the values of the characteristics along the shape space for the moving object to one or more identification classes for an object type and determines corresponding weighting coefficients for the object in the image. The RBF classifier determines that an object is of the class that has the maximum value of weighting coefficients. Preferably, the RBF classifier outputs a value which indicates the probability that the object belongs to the identified class of objects.

Thus, the RBF classifier that receives, for example, the x-gradient vector of an object in the ROI as input will output a probability that it is the logo. Because the RBF programming comprising the logo ID analysis includes training the RBF classifier with various perspectives (including rotation), lighting and scaling of the logo, the probability is provided for a logo in the image that may have various perspectives, lighting and size, such as those shown for the logo "M" in FIG. 1b. The other RBF classifiers that comprise the ensemble of RBF classifiers (that is, the RBF classifiers for the y-gradient and the x-y-gradient) will also provide a classification output and probability for the input vectors for the object. The classes identified by the three RBF classifiers and the related probability are used in a scoring scheme to conclude whether or not the object in the ROI is the logo.

The objects in each ROI are analyzed by the logo ID analysis in this manner to determine if the object is the logo. If an object in the ROI is determined to be the logo, then as shown in FIG. 124d, the logo is then tracked in the received image, shown in FIG. 3 as tracking analysis block 124d. As noted, this processing keeps track of the logo if it moves within the frame of the image because the camera transmitting the image is rotated or otherwise moved, for example. It is noted that, when the camera is panned or otherwise moved, the logo does not move with respect to the background objects in the image and thus is not an object that is itself "in motion" in the video image. (By moving the camera, the position of the logo may change slightly with respect to other features in the image, but this is not a substantial movement that may be tracked using techniques directed an object that is itself actually in motion.)

Such tracking of the position of the logo within the frame of the image is done, for example, by creating a template of the logo from a frame of the datastream once it is identified as the logo in the logo ID analysis processing 124b described above. The template may be based, for example, on extracted x-y gradient extracted for the logo in the RBF processing in the logo ID analysis 124b described above. An x-y gradient may be generated in the same location in subsequent images at regular intervals (for, example, every tenth image frame received in the datastream). The extracted gradient may be compared to determine if there is a match with the features of the x-y gradient in the subsequent image. If so, then it is concluded that the image of the logo has been sustained in the datastream at the same position over the interval. (The interval will generally be of a sufficiently small duration so that a camera could not be moved and then returned to the same position in the interval.)

If not, then an x-y gradient is generated for the sub-region of the image surrounding the last known position of the logo in the image. The extent of the sub-region is defined by how far the image could possibly move within the frame of the image during the interval by an operator panning or otherwise moving the camera. (As noted, the interval is generally sufficiently small so that an operator would be unable to physically move the camera enough to significantly change the position of the logo within the frame of the subsequent image.) If the extracted gradient matches the gradient of an object within the sub-region, then it is again concluded that the image of the logo has been sustained in the datastream (although the camera has been moved), and the position of the logo in the image is updated in processor 124.

In this manner, the logo identified in the datastream is tracked until it is no longer detected in the image. Typically, the logo will vanish from the datastream one of a number of reasons, including, 1) the camera supplying the image is panned or otherwise moved so that the logo lies outside its field of view, 2) the logo is completely or substantially obscured in the field of view of the camera supplying the image, 3) the camera supplying the video datastream of the event is changed, and the logo lies outside the field of view of the new camera, or 4) there is a break in transmission of the event, for example, for a commercial. In that case, the processing conducted by processor 124 returns to the ROI analysis 124a of the datastream, followed by logo ID analysis 124b, as described above. If and when the logo is again identified in the datastream, tracking 124d and output processing 124c is also performed, again as described above. The sequence of processing is repeated as the logo vanishes from the datastream and then subsequently re-appears.

Under certain circumstances, the logo may become obscured within the image. For example, in a baseball game, a player may step between the logo and the camera, thus blocking the logo from the transmitted image. If the logo is wholly or substantially obscured, then the logo effectively vanishes from the datastream, and the processing performed returns to the ROI analysis 124a and logo ID analysis 124b as described directly above. When the logo becomes visible in the image, it is detected in the ROI analysis 124a and logo ID analysis 124b and again tracked.

There may be circumstances where the logo can become partially obscured in the image, for example, if a player blocks part of the logo from the camera. If necessary, the processing that determines an ROI in the ROI analysis 124a is adjusted so that it has a lower threshold of identifying an ROI. For example, if texture is used to identify an ROI in the image as in the "M" example given above, a sub-region having only two (or one) linear feature may be found to be an ROI. Thus, if there are still a minimum number of defining features visible for a blocked logo, an ROI is found by the ROI processing 124b. Likewise the RBF classifier used in the logo ID analysis 124b may be trained with partial images of the logo and/or the threshold probabilities used to determine whether the object is the logo may be adjusted to accommodate partial images. In this manner, the processor 124 is programmed to identify a partially obscured logo in the datastream. Similarly, the match required between the extracted gradient and the gradient generated from a subsequent image in the tracking processing 124c may be lessened so that an logo that is partially obscured during tracking will continue to be tracked.

Referring back to FIG. 3, the tracking processing 124b provides data for output processing 124c conducted by the processor 124. The output processing 124c may be, for example, the total time that the logo is visible in the datastream for the event, the percentage of time the logo is visible, etc. Thus, the tracking processing 124b may provide an ongoing indication of when the logo is detected in the datastream and when it is subsequently not detected in the datastream. The output processing may keep track of the total time the logo is detected in the datastream (the "detected time"), as well as the total time of the event, for example. The detected time gives how long the logo is visible in absolute terms; the detected time may be used with the total event time to give the percentage of time the logo is visible over the course of the event. Data generated by the logo ID processing 124b and the tracking 124d relating to the size, perspective, illumination, etc. of the logo in the image can also be transmitted for output processing 124c. Using that data, the processor 124 can generate not only the amount of time the logo is visible, but also keep track of the quality of the logo's visibility during the event.

It is also noted that other statistical analysis may be performed. For example, the system may be used to compare the time of exposure of a company's logo with the time of exposure of other logos during an event. The processor may be programmed in the manner described above to simultaneously identify and track the company's logo, as well as the others, in the image datastream. The times that each logo is visible may thus be compiled for the event and compared. In addition, the amount charged to a company may be based on the amount of time its logo is visible during the event.

Figure 4:
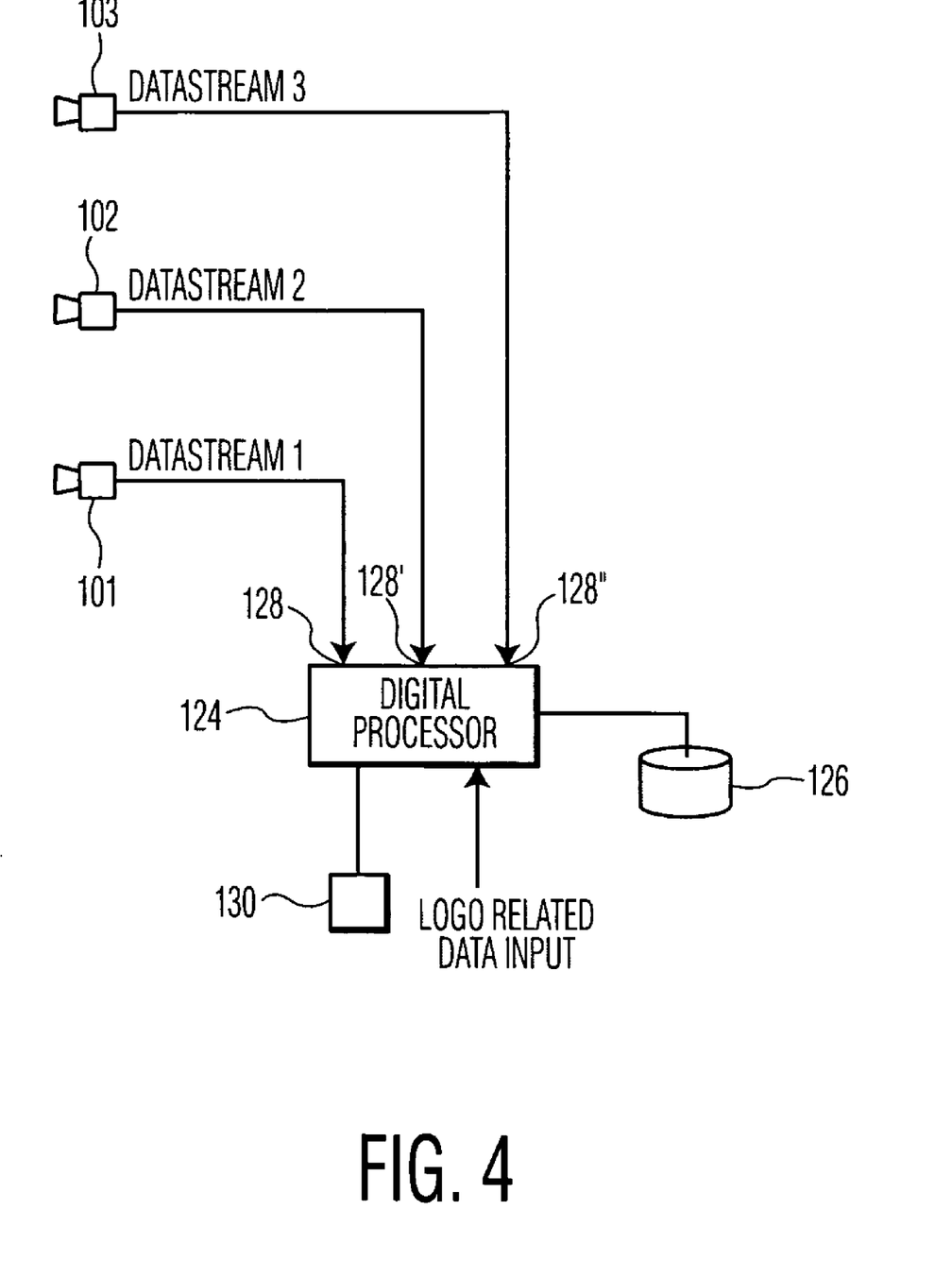
FIG. 4 depicts a system in accordance with a second embodiment of the invention.

Other variations of the above-described embodiment may be used to provide output determinations other than the analysis of exposure time of the logo. As noted, the above-described embodiment is used to analyze the logo's exposure in the broadcast datastream. Thus, the determination of which camera (which generate separate video datastreams of the event) is selected to broadcast the event at any given point during the event has been made upstream (that is, prior to receipt by digital processor 124 in FIG. 2). In an alternative embodiment, FIG. 4 shows the digital processor 124 receiving a number of data streams from a number of cameras (shown to be the three cameras 101–103 of FIG. 1a) covering an event. Each datastream is simultaneously processed by the processor 124 to detect a logo therein. That is, each datastream received is separately processed by the processor 124 as shown in FIG. 3 and described above. Detection of the logo in some, but not all of the datastreams can be used by an event producer in deciding which camera to use to broadcast the event over a particular interval of time. For example, if a sponsor's logo is visible in the datastream for one of the three cameras, then if the producer has the ability to choose between cameras that can broadcast the event at that point in time, the producer may decide to use that camera that shows the logo.

Although illustrative embodiments of the present invention have been described herein with reference to the accompanying drawings, it is to be understood that the invention is not limited to those precise embodiments. For example, the RBF classifier used in the above-embodiments for the logo ID processing 124b conducted by processor 124 may be replaced with a template matching software technique. A series of templates for the logo having different perspectives, scales, etc. can be input to the processor 124, or internally generated based on an input frontal view of the logo. After ROIs are identified in an image as previously described, gradients may be generated for the objects in the image. The template may be compared with the objects and a percentage of pixels for each object that falls within the template is generated. If the percentage is less than a threshold amount, the logo ID analysis concludes that the object is the logo. Accordingly, it is to be understood that it is intended that the scope of the invention is as defined by the scope of the appended claims.

What is claimed is:

1. A method for insuring the video broadcast of a logo for a period of time, comprising the steps of:
   receiving at least one video datastream of an event;
   identifying one or more regions of interest (ROIs) having characteristics associated with a logo of interest in one or more images comprising the at least one datastream;
   analyzing the one or more ROIs to detect if the logo is present in at least one of the ROIs;
   responding to the detection of the presence of the logo for selectively broadcasting the associated ROI for at least a minimum period of time; and
   tracking in real time the total time the logo is present during the period of time the event is broadcast, to permit associated advertisers to independently confirm acceptable broadcast of paid for advertising.

2. The method of claim 1, wherein the at least one video datastream comprises a single broadcast datastream.

3. The method of claim 1, wherein the at least one video datastream comprises two or more separate video datastreams, the two or more datastreams being individually selectable for broadcasting the event via the one's of said datastreams showing the logo until the total time the logo has been broadcasted during the event is at least equivalent to the associated paid for advertising time.

4. The method of claim 1, wherein the step of identifying one or more ROIs for the logo is based on at least one of a color, shape, and texture of the logo.

5. The method of claim 4, wherein identifying one or more ROIs for the logo comprises identifying a number of adjacent pixels having the same color as the logo.

6. The method of claim 4, wherein identifying one or more ROIs for the logo comprises identifying measures of texture in samples of a location within the image that correspond to like measures of texture of the logo.

7. The method of claim 4, wherein identifying one or more ROIs for the logo comprises using template matching that identifies shapes within the image that correspond with the shape of the logo.

8. The method of claim 1, wherein analyzing the one or more ROIs to detect if the logo is present in at least one of the ROIs comprises using radial basis function (RBF) classification modeling.

9. The method of claim 8, wherein the RBF classification modeling includes training using images of the logo having a multiplicity of perspectives and scales.

10. The method of claim 1, wherein analyzing the one or more ROIs to detect if the logo is present in at least one of the ROIs comprises using template matching.

11. A system for detecting and analyzing the presence of a logo, the system comprising a processor having input that receives at least one video datastream of an event, identifies one or more regions of interest (ROIs) for the logo in one or more images comprising the at least one datastream, analyzes the one or more ROIs to detect if the logo is present in at least one of the ROIs, and insures that an ROI having the logo is broadcast during the event for at least a total period of time corresponding to an associated advertiser's prepaid advertising.

12. The system of claim 11, wherein the processor receives one video datastream of the event, the one video datastream comprising a single broadcast datastream.

13. The system of claim 11, wherein the processor receives two or more separate video datastreams, the two or more datastreams being individually selectable for broadcasting the event via the one's of said datastreams showing the logo until the total time the logo has been broadcasted during the event is at least equivalent to the associated paid for advertising time.

14. Software stored on a computer readable medium for detecting and analyzing the presence of a logo, the software receiving as input digital representations of images that comprise at least one video datastream of an event, the software identifying one or more regions of interest (ROIs) for the logo in one or more images comprising the at least one datastream, analyzing the one or more ROIs to detect if the logo is present in at least one of the ROIs, and monitoring the presence of the logo in the image when so detected, wherein the software provides an output regarding detection of the presence of the logo that is usable in insuring the broadcast of the logo during the event for a total accumulated time corresponding to paid for advertising of an advertiser.

15. A system for detecting and analyzing the presence of a logo, the system comprising a processor having input that receives at least one video datastream of an event, analyzes the image to determine if the logo is present in at least one portion of the image and monitors the presence of the logo in the image when so detected, wherein the detection of the presence of the logo is used in insuring the broadcast of the logo during the event for a total accumulated time corresponding to paid for advertising of an advertiser.

* * * * *